United States Patent
Sexton

(10) Patent No.: US 6,848,394 B1
(45) Date of Patent: Feb. 1, 2005

(54) CAT LITTER BOX

(76) Inventor: Michael Allan Sexton, 4039 Eve Dr. East, Jacksonville, FL (US) 32246

(*) Notice: Subject to any disclaimer, the term of this patent is extended or adjusted under 35 U.S.C. 154(b) by 0 days.

(21) Appl. No.: 10/370,826

(22) Filed: Feb. 20, 2003

(51) Int. Cl.$^7$ ............................................. A01K 29/00
(52) U.S. Cl. ..................................... 119/170; 119/165
(58) Field of Search ................................. 119/161, 165, 119/170

(56) References Cited

U.S. PATENT DOCUMENTS

| | | | |
|---|---|---|---|
| 4,271,544 A | * | 6/1981 | Hammond .................. 119/165 |
| 5,032,254 A | | 7/1991 | Deboer |
| 5,042,430 A | | 8/1991 | Casmira |
| 5,134,974 A | * | 8/1992 | Houser ....................... 119/168 |
| 5,178,099 A | | 1/1993 | Lapps |
| 5,551,569 A | | 9/1996 | Garvin-Mazzarisi |
| 5,806,461 A | * | 9/1998 | Kiera .......................... 119/165 |
| 5,983,831 A | | 11/1999 | Thompson |
| 6,039,003 A | | 3/2000 | Cox |
| 6,055,935 A | * | 5/2000 | Engel .......................... 119/170 |
| 6,237,534 B1 | | 5/2001 | Schwartz |
| 6,439,161 B1 | | 8/2002 | Clemmons |

* cited by examiner

Primary Examiner—Teri Pham Luu
Assistant Examiner—Elizabeth Shaw
(74) Attorney, Agent, or Firm—Lawrence J. Gibney, Jr.

(57) ABSTRACT

The embodiment of this invention is disclosed, which describes a cat litter box, which will allow cat owners to change litter without having to touch or manipulate the soiled litter. The device consists of a box within a box. The inside box is made with swinging trap doors on the bottom of the interior part of a shell of the device. This allows the cat litter to flow freely from the interior shell to the bottom half of the exterior shell. The bottom half of the exterior shell contains a garbage bag, which catches the soiled litter and allows easy disposal. The doors, which would swing open as the cat litter box is lifted upwards, are hinged so they will freely open and close in normal operation.

8 Claims, 3 Drawing Sheets

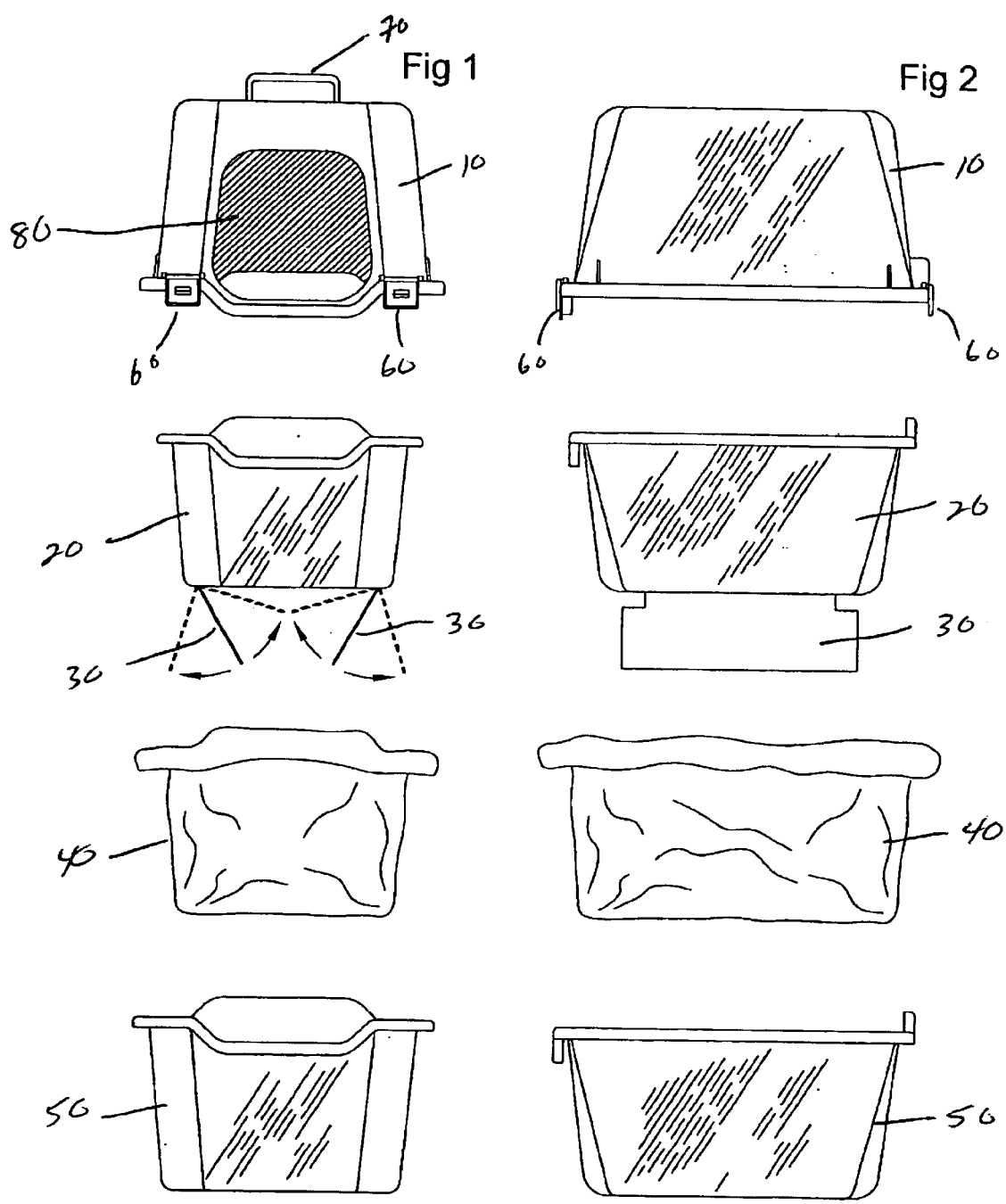

CAT LITTER BOX

CROSS REFERENCES TO RELATED APPLICATIONS

None

STATEMENT REGARDING FEDERALLY SPONSORED RESEARCH

No federal research money was used in the development of this invention.

REFERENCE TO APPENDIX

No appendix accompanies this application

BACKGROUND OF THE INVENTION

The cat litter box is a device, which is used to collect in one location the waste products from a cat. The usual box consists of a rectangular shape into which the cat will deposit its excrement. Without some type of cat litter box the cat is likely to deposit its excrement in various locations. This, of course, is not desirable and a cat litter box centralizes the waste station. One of the byproducts of a centralized waste station is the necessity to change the soiled contents of the cat litter box.

This invention relates to a device, which allows the cat owner to change the litter box without having to touch the litter. A person who owns a cat realizes that one of the least liked jobs is changing the litter box after the cat has deposited its waste. The job of changing the soiled litter can be messy and smelly. The ordinary means of disposal is to place the soiled litter into a garbage bag or similar container and properly dispose of the waste.

In the usual litter box a garbage bag may be placed in the bottom of the shell of the litter box and litter is poured on top of the garbage bag. Unfortunately as the cat uses the litter box the claws of the cat frequently tear the garbage bag. This damages the garbage bag and destroys the effectiveness of the garbage bag because it will no longer hold the soiled litter when the litter is to be changed.

If a garbage bag is not placed on the bottom of the shell of the litter box, the cat owner is forced to pour the soiled litter into a garbage bag.

This device will allow the cat owner to simply and efficiently empty the litter in a waiting receptacle, which in this case will be a garbage bag. This allows the cat to use the litter box without tearing the garbage bag as it is commonly done in other types of litter boxes. The garbage bag is placed between an interior shell and the bottom half of the exterior shell of the cat litter box and is not in contact with the claws of the cat. In this manner the garbage bag is kept completely intact. This will allow a quick, easy and neat method by which the cat owner can change a litter box.

BRIEF SUMMARY OF THE INVENTION

This cat litter box utilizes a trap door device to efficiently and quickly empty soiled litter into a separate garbage bag, which has been placed between an interior shell and the bottom half of the exterior shell of the cat litter box. The invention itself contains an interior shell, which contains the litter, the bottom half of the exterior shell, which houses the garbage bag and the interior shell, and a top half of the exterior shell, which is clasped to the interior shell. An opening is also provided to allow the cat ingress and egress.

A garbage bag is placed on the interior surface of the bottom half of the exterior shell; the interior shell is placed on top of the garbage bag and fits snugly within the bottom half of the exterior shell. Cat litter is then poured into the interior shell. On the bottom of the interior shell is a hinged mechanism consisting of doors, which will open when the interior shell is lifted. This allows the cat litter to dump directly into the garbage bag, which has been placed inside the bottom half of the exterior shell. As the interior shell is lifted, the cat litter flows through the trap doors and into the awaiting garbage bag. The garbage bag is then tied and neatly disposed. A new garbage bag is then placed within the bottom half of the exterior shell. The cat litter is then refilled within the interior shell of the device and the cat is now free to use the litter box.

The novelty of this idea is the use of a trap door mechanism, which allows the cat litter to freely flow from the interior shell to the bottom half of the exterior shell. The doors themselves would overlap one another so that the cat's claws do not get caught or snag the inside of the shell or snag the garbage bag, which lies underneath the doors.

Hinges are used so that the doors on the bottom of the interior shell will freely open and close. This would allow the litter box to be used without the owner having to contact any part of the litter.

Another advantage to this device is that the garbage bag, which is used in this invention but is not part of the invention, is not in contact with the claws of the cat. In some cat litter boxes, which use garbage bags, the claws of the cat are in contact with the garbage bag and frequently rip or tear the garbage bag. This destroys the effectiveness of the garbage bag and forces the user of the litter box to change the litter box in the usual fashion.

BRIEF DESCRIPTION OF THE DRAWINGS

The invention is further described in the accompany drawings.

FIG. 1 is a front exploded view of the cat litter box.

FIG. 2 is a side exploded view of the cat litter box.

DETAILED DESCRIPTION

Figure 3:
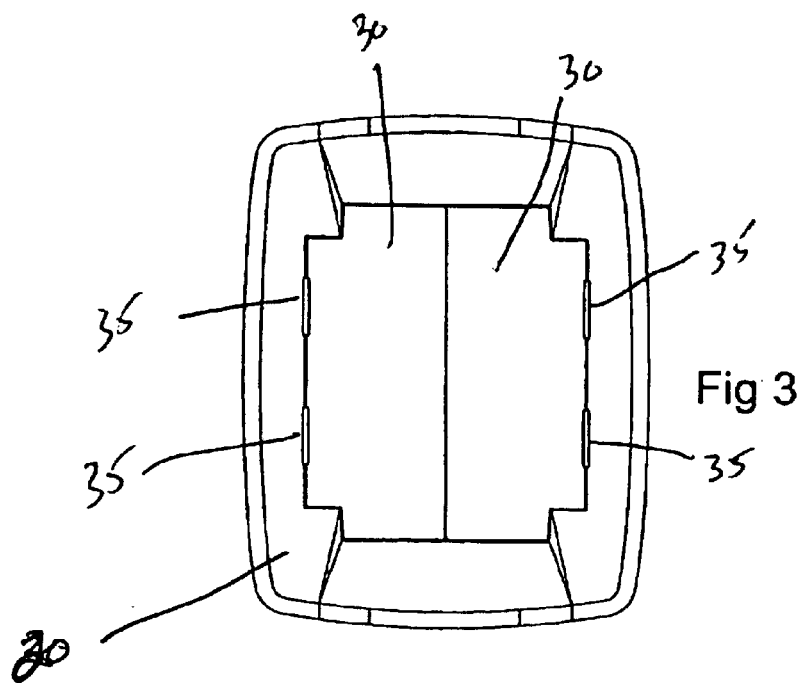
FIG. 3 is the top view of the interior shell showing the doors of the cat litter box.
Figure 4:
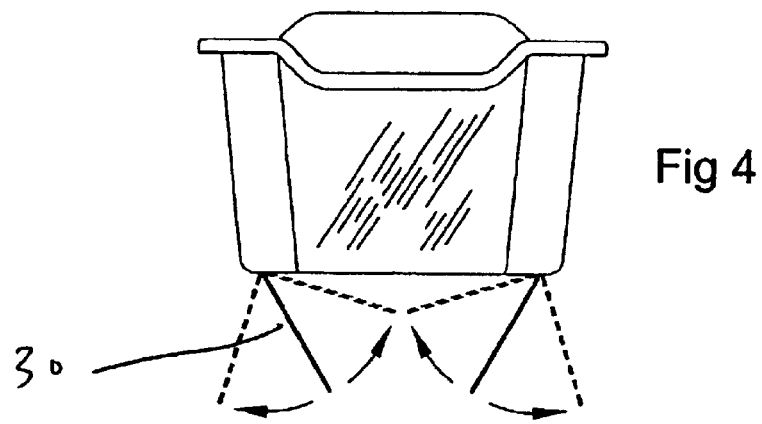
FIG. 4 is a front view of the interior shell showing the door mechanism.

FIGS. 1 and 2 show the device from the front and the side. In FIG. 1 this invention is depicted as a box within a box, which has the top half of the exterior shell (#10) an interior shell (#20), a swinging or trap door mechanism (#30), a garbage bag (#40) and the bottom half of the exterior shell (#50). The trap door mechanism consists of two separate doors, which swing open and shut through the use of hinges (#35) (FIG. 3). The garbage bag (#40) is not part of this invention but is used in conjunction with this device and is positioned between the bottom half of the exterior shell (#50) and the interior shell (#20). The bottom half of the exterior shell (#50) is lined with the garbage bag and can accommodate the interior shell (#20). The garbage bag is not part of the invention but is required to be used as part of the invention. The garbage bag is a standard size garbage bag or may be specifically fit to fit the dimensions of the bottom half of the exterior shell.

The interior shell is equipped with the trap door or swinging door mechanism (#30). The trap door mechanism is attached to the bottom of the interior shell by hinges (#35) (FIG. 3 and FIG. 5), which are located on the outside edges of the interior shell (#20). It is contemplated that there will be two hinges (#35) per door (#30). The hinges (#35) allow the trap doors (#30) to swing freely open and close without the user of the litter box needing to touch the trap door mechanism or the litter inside the interior shell (#20).

The top half of the exterior shell (#10) is secured to the interior shell using locking clasps (#60). These locking clasps are not unique to this invention but may be used in order to lift the top half of the exterior shell and the interior shell when the litter is being changed.

The top half of the exterior shell has a handle (#70), which is used for carrying the litter box. The top half of the exterior shell and the handle are not part of this invention.

An opening (#80) is provided in the top half of the exterior shell (#10) to allow the cat ingress and egress to and from the box.

The cat litter is placed on top of the hinged trap doors (#30). The doors would overlap in the center of the doors to prevent the cat's claws from getting stuck on the trap door and prevent the cat's claw from connecting with and tearing the garbage bag, which lies underneath the interior shell (#20). The trap doors (#30) provide a barrier between the cat litter and the garbage bag.

In its normal operation the cat owner would place a garbage bag (#40) on the inside of the bottom half of the exterior shell (#50). The interior shell (#20) is then placed over the garbage bag and cat litter is poured on top of the trap door mechanism (#30). The top half of the exterior shell (#10) is then clasped on the interior shell of the litter box.

The cat would go into the cat litter box through the opening (#80) and use the litter box. The cat owner, when it was necessary to change the litter, would simply lift the interior shell (#20) in an upward fashion. The interior shell (#20) can be attached to the top half of the exterior shell (#10) by clasps (#60). This would force the trap doors (#30) to be opened by the weight of the cat litter and the cat litter would flow from the interior shell (#20) to the garbage bag (#40). Once the litter has been emptied from the interior shell the trap door mechanism would again shut because the hinges (#35), which have been used to install the trap doors (#30), force the doors shut.

This enables the consumer to empty a litter box without requiring the user to handle the used or soiled litter. Once the soiled litter has fallen into the garbage bag the bag is removed from the bottom half of the exterior shell (#50) and a new garbage bag is inserted in its place. The cat owner would then unclasp the top half of the exterior shell (#10) from the interior shell (#20) and refill the bottom of the interior shell (#20). The owner would then reattach the top half of the exterior shell (#10) to the interior shell (#20) and place the attached parts over the new garbage bag (#40), which has been placed on the inside surface of the bottom half of the exterior shell (#50). The cat is now in a position to again use the litter box.

Figure 5:
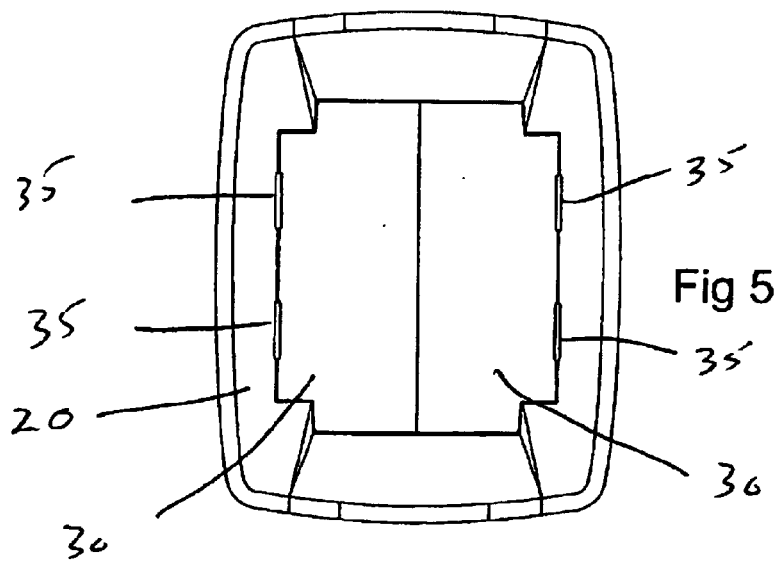
FIG. 5 is the bottom view of the interior shell.
Figure 6:
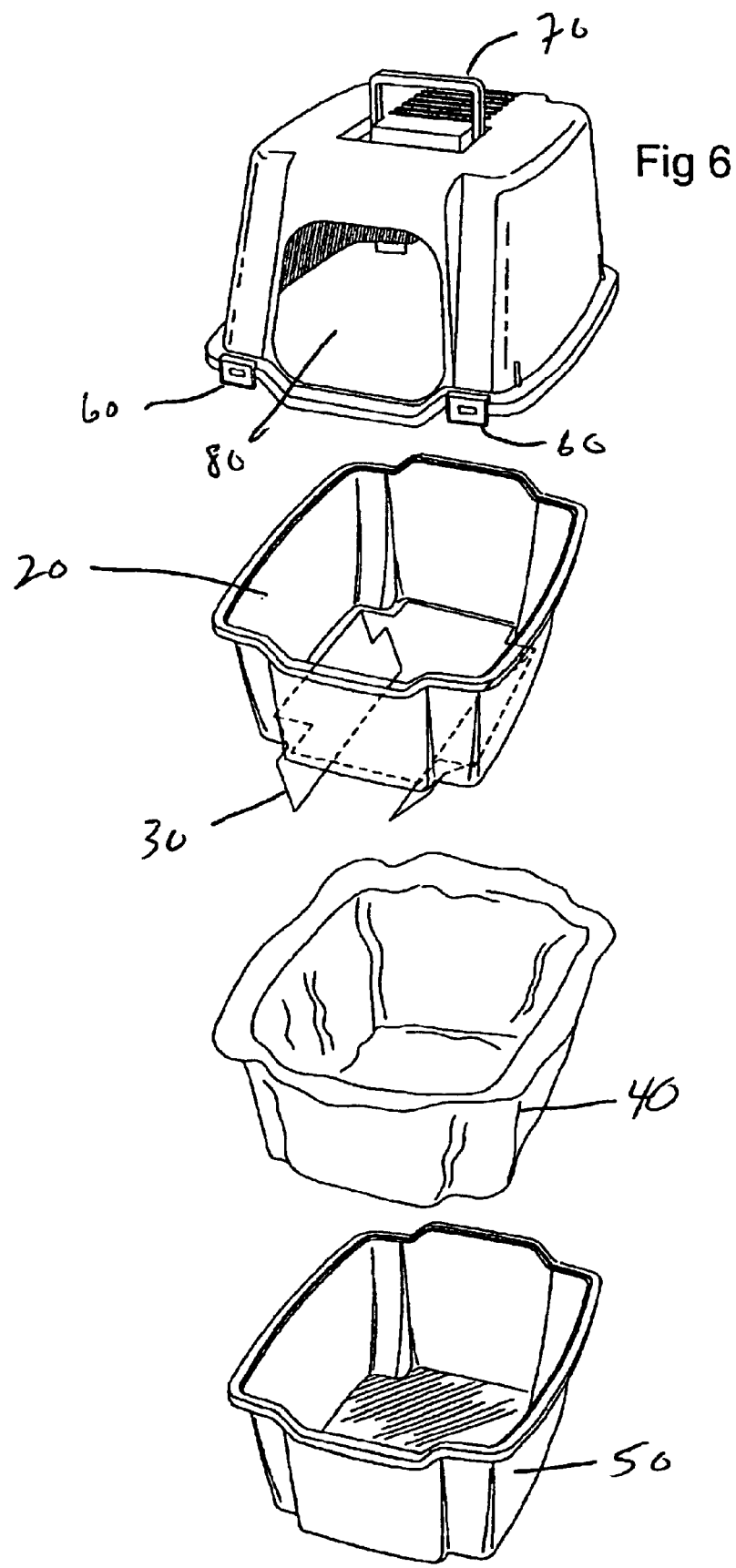
FIG. 6 is a perspective view of the device.

FIG. 3 shows a top view of the device with the sides of the interior shell (#20), the top view of the trap doors (#30) and the hinges (#35), which allow the doors (#30) to swing open and shut. There are two identical doors (#35) hinged on the bottom of the interior shell (#20). The hinges are located on the outer surface of the bottom of the interior shell. FIG. 5 is a view of the interior (#20) shell from the bottom. FIG. 6 shows a perspective view of the device in an exploded view.

The choice of material is not material to this invention and the use of existing material in the construction of cat litter boxes may be used.

What is claimed is:

1. A cat litter box, which comprises the following:
  a. an exterior shell;
  b. an interior shell;
  c. a trap door mechanism; and
  d. clasps;
  wherein the exterior shell has a top half and a bottom half;
  wherein the interior shell is placed inside the device on top of the bottom half of the exterior shell;
  wherein the said top half of the exterior shell is equipped with clasps for attaching the top half of the exterior shell to the interior shell;
  wherein the interior shell is open at one end for the cat to enter the device and is equipped with a trap door;
  wherein a trap door mechanism is placed on the bottom of the interior shell;
  wherein a cat litter bag is placed between the underside of the trap door and the interior surface of the bottom half of the exterior shell.

2. The bottom half of the exterior shell as described in claim 1 wherein it houses the interior shell.

3. The interior shell as described in claim 1, which is further comprised of the following: a bottom surface, four walls, and hinges.

4. The bottom surface of the interior shell as described in claim 3 where the cat litter is placed.

5. The four walls as described in claim 3, wherein the walls form the sides of the interior shell.

6. The hinges as described in claim 3, which are used to allow the trap door to open when the device is lifted.

7. The trap door mechanism as described in claim 3, is secured by hinges to the bottom surface of the interior shell.

8. The trap door mechanism as described in claim 3 is opened by the weight of the litter as the device is lifted in an upward direction.

* * * * *